(12) United States Patent
Ma

(10) Patent No.: US 8,363,204 B2
(45) Date of Patent: Jan. 29, 2013

(54) BRIGHTNESS AND COLOR ENHANCEMENT FILM FOR LED TV AND MONITOR

(75) Inventor: Yao-Dong Ma, Frisco, TX (US)

(73) Assignee: MacroDisplay Inc., Richardson, TX (US)

( * ) Notice: Subject to any disclaimer, the term of this patent is extended or adjusted under 35 U.S.C. 154(b) by 211 days.

(21) Appl. No.: 12/928,316

(22) Filed: Dec. 8, 2010

(65) Prior Publication Data

US 2012/0147315 A1   Jun. 14, 2012

(51) Int. Cl.
*G02F 1/13* (2006.01)
*G02F 1/1335* (2006.01)
*C08F 2/46* (2006.01)

(52) U.S. Cl. ............. 349/194; 349/96; 349/97; 349/61; 427/492

(58) Field of Classification Search ............... 349/194, 349/96, 97, 61; 427/492
See application file for complete search history.

(56) References Cited

U.S. PATENT DOCUMENTS

| | | | | |
|---|---|---|---|---|
| 5,325,218 A * | 6/1994 | Willett et al. | ............ | 349/74 |
| 6,532,049 B1 * | 3/2003 | Li et al. | ............ | 349/98 |
| 6,633,354 B2 * | 10/2003 | Li et al. | ............ | 349/115 |
| 6,934,082 B2 * | 8/2005 | Allen et al. | ............ | 359/493.01 |
| 7,029,729 B2 * | 4/2006 | Spawn et al. | ............ | 428/1.1 |
| 7,095,466 B2 * | 8/2006 | Ma | ............ | 349/115 |

* cited by examiner

*Primary Examiner* — Mike Qi

(57) ABSTRACT

The present invention relates to an optical enhancement film, more specifically, to a cholesteric reflective polarizer film, which is characterized by matching and compensating the emitting spectrum of a white LED backlight for LCD TVs and Monitors. The film not only enhances the brightness of the LED-backlit displays by light recycling effect but also increases the color rendering quality of the LED-backlit displays by phase balancing effect.

20 Claims, 3 Drawing Sheets

BRIGHTNESS AND COLOR ENHANCEMENT FILM FOR LED TV AND MONITOR

FIELD OF INVENTION

The present invention relates to an optical enhancement film, more specifically, to a cholesteric reflective polarizer film, which is characterized by matching and compensating the emitting spectrum of a white LED backlight for LCD TV, monitor and other devices. The film not only enhances the brightness of the LED-backlit displays by light recycling effect but also increases the color rendering quality of the LED-backlit displays by phase balancing effect.

BACKGROUND OF THE INVENTION

Currently, a white LED becomes more and more popular for the backlighting unit (BU) of various TFT LCD devices, such as LED TV and LED monitor. The edge light design of the white LED has the following advantages compared with the traditional CCFL BU:
1. Super slim structure. The total thickness of the display panel including front bezel, TFT panel, backlight and back cover will be much thinner than that of the RGB LED panel and the CCFL BU panel.
2. More uniform color range across the screen. The LED light can be arranged either horizontally or vertically.
3. More environmental friendly.

But there are two disadvantages of the white LED BU compared with CCFL BU:
1. The color gamut of the white LED is not as wide as CCFL BU in red and green color wavebands. Color rendering index, Ra, is 75 for Blue LED+Yellow Phosphor type, while CCFL's Ra is over 80.
2. Brightness and energy efficiency is lower due to phosphor conversion, stokes shift and self absorption.

The current TFT makers around the world are trying to redesign the absorptions and the transmissions of color filter arrays via adjusting R.G.B color coordinates to fit the LED BU. Obviously, such designs which renders more absorption in the blue color and less absorption in green and red will increase the energy consumption and decrease the color quality and the brightness of the display. In other word, the color balancing is actually in the cost of further reduction of the brightness of the LED BU.

The question is how to achieve better brightness and color balance with a less power consumption than that of the traditional CCFL backlight?

The solution is to use a special brightness enhancement film, which is capable of matching the spectrum of the white LED so as to enhance the brightness and the Color quality of the LED TV/monitor.

Cholesteric liquid crystal polymer (CLCP) film is characterized by the fact that it selectively reflects the incoming light and turns out a narrow band circular polarization to the front viewer. The CLCP film is utilizing "Bragg reflection", one of the intrinsic properties of cholesterics. In Bragg reflection, only a portion of the incident light with the same handedness of circular polarization and also within the specific wave band can reflect back to the viewer. The remaining spectra of the incoming light, however, including the 50% opposite-handed circular polarization and the same-handed out-off Bragg reflection wave band will pass through the film. Theoretically, the reflective component is narrow band circular polarization while the transmissive one is broadband elliptical polarization.

A broadband reflection can be also realized by means of changing the helical structure of the CLCP film.

The cholesteric broadband polarizer (BBP) was first disclosed, to the knowledge of the applicant, in the article "Cholesteric Color Filter Made From Cholesteric LC Silicones", published May 15, 1990 (SID 90 Digest. 111). The paper describes experiments concerning the construction of broadband polarizer by combining layers of cholesteric LC-silicones of different reflection wavelength. Five LC-silicon layers were stacked together and the circular polarization was observed from 430 nm to 670 nm. The ellipticity spectra for the combined layers were also calculated from the spectra of each single layer. The good agreement with the observed spectra clearly demonstrates the conservation of circular polarization by transmitting light through cholesteric layers. For that reason it is possible to arrange LC-layers with different Bragg reflection wavelengths to get broadband filters without loss of circular polarization.

The European Patent Application 94200026.6 with the title of "Cholesteric Polarizer and Manufacture Thereof", published Jul. 20, 1994 and assigned to Philips Electronics, N.V. of Eindhoven, Netherlands (the "Philips reference") introduces a method to make a single layer CLCP film having broadband reflection and transmission characteristics. The Philips disclosure requires adding a UV dye into CLCP mixture so that the pitch of the CLCP material changes linearly from its maximum value at one film surface to its minimum value at the other film surface. The CLCP material is formed from two polymerizable chiral and nematic monomers, each of which has a different reactivity. During polymerization of the mixture by means of UV exposure, a linear variation in UV light intensity is to be preferentially incorporated into the least reactive monomer to occur at the location of the highest radiation intensity. As a result, at least one concentration gradient of free monomers is formed during polymerization, causing the monomer to diffuse from locations with a low monomer concentration to the location with a high concentration. The monomers of high reactivity diffuse to the locations where the radiation intensity is the highest. As a result, the composition of the material varies in a direction transverse to the surfaces of the film such that a linear variation in the pitch of the molecular helices results in the layer formed by the polymer. The liquid crystal material is distributed linearly across the thickness of the film. This variation in pitch provides the optically active layer with a bandwidth proportional to the variation in the pitch of the molecular helices.

An article "From Selective to Wide-band Light Reflection: a Simple Thermal diffusion in a Glassy Cholesteric Liquid Crystal", published Dec. 17, 1998, Physical Journal B, France, introduces a method to fabricate a wide-band circular polarizer. The method relates to a spontaneous diffusion of monomers into a polymerizable CLCP film and then following a UV polymerization. The fabrication is carried out by depositing a film of reactive monomers on the surface of a polymerized film of CLCP material. The diffusion of monomers into the CLCP film layer causes a concentration gradient in the layer before diffusion is halted. As a result, the original CLCP material swells slightly causing an increase in pitch of the molecular helices. This provides a concentration gradient which, in turn, results in a "linear variation" in pitch across the film thickness. Polymerization of the layer by UV light exposure halts diffusion providing a broadband polarizer.

U.S. Pat. No. 6,532,049 with the title of "Circularly Polarizing Reflective Material. Having Super Broad-band Reflection and Transmission Characteristics and Method of Fabricating and Using Same in Diverse Applications" published Mar. 11, 2003 and assigned to Reveo, Inc. of Elmsford N.Y.

(the "Reveo refIerence"), introduces a method for fabricating a broadband circularly polarizing material. According to the method, a CLCP material is mixed with non-cross linkable liquid crystal material, a photoinitiator and a chiral additive at a temperature, which maintains the mixture in a liquid crystal state. While being heated, the mixture is subjected to UV light radiation for a time and at an intensity sufficient to polymerize the CLCP material or the liquid crystal material or both. Such polymerization occurs in a non-linear fashion, thereby resulting in a non-linear distribution of the polymer and the liquid crystal material across the During polymerization, phase separation takes place. The segregation rate of the liquid crystal material is designed to be greater than the polymerization rate of the CLCP material being polymerized. Thus, the liquid crystal material segregates and diffuses to sites of enlarged pitch in the CLCP material from sites of shrunken pitch in the CLCP material. Consequently, an exponentially distributed pitch is generated from one surface to the other of the CLCP film.

In the U.S. Pat. No. 7,095,466 with the title of "Diffusively Reflective Circular Polarizer formed By thermo Phase Separation," the applicant introduces a fabrication method of thermo phase separation to convert the CLCP film from narrow band planar structure into broadband microchip structure, herein incorporated by reference.

Within the above-mentioned prior art, all the reflective polarizers reported are designed for the full spectrum broadband applications, which could be used for the traditional CCFL backlighting unit. However, the production process is normally slow and the LCP film is relatively thick to achieve a sufficient bandwidth. Therefore, the limitations of production throughput and material cost have remarkably hindered its application as the brightness enhancement film.

SUMMARY OF THE INVENTION

It is the primary objective of the present invention to provide a reflective polarizer film which matches the emitting waveform of the white LED to achieve extraordinary optical performances.

It is another objective of the present invention to provide a brightness enhancement film which is capable of exactly recycling the backlight spectrum of the LED TV and monitor.

It is also another objective of the present invention to provide a color enhancement film with an optimal retardation to minimize color shift and to maximize the color rendering quality.

It is still another objective of the present invention to provide a fabrication method of a cholesteric film with a combination of a narrow band layer and broad band layer.

It is still another objective of the present invention to provide a means to enhance especially the LED brightness in the minor wavelengths.

It is another objective of the present invention to provide a UV curable two-layer structure wherein the first layer is of narrow band blue color and the second layer is of broad band yellow color.

It is a further objective of the present invention to provide a single-layer cholesteric film formed by a controllable thermo induced pitch change effect.

It is, once more, another objective of the present invention to provide a cost effective, continuous process for the mass production of the brightness and color enhancement film.

DETAILED DESCRIPTION

Figure 1:
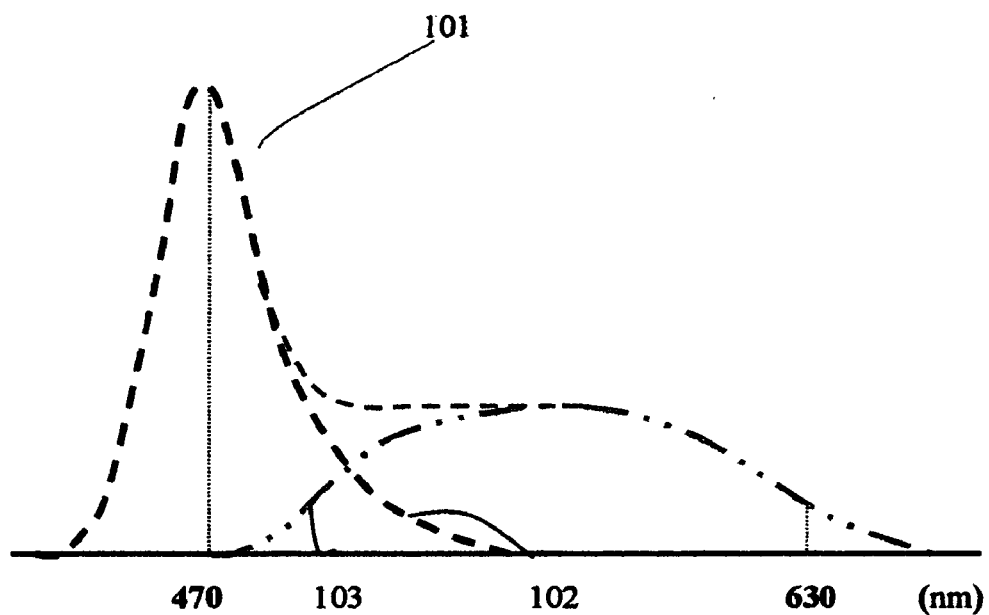
FIG. 1 demonstrates an emitting spectrum of a white LED backlight unit.

Referring first to FIG. 1, illustrated is a schematic curve of an emitting spectrum of a white LED BU. The current white LED emitting curve 101 consists of two emitting wavelengths: the first is a narrow but sharp intrinsic blue waveform 102 with the enter wavelength of 470 nm and bandwidth of 30 nm; the second is a wide yellow waveform 103 converted by a phosphor coating layer on the top of the blue diode with the center wavelength of 575 nm and bandwidth of 135 nm. Such a white LED is a phosphor converted LED wherein LED photons pump phosphor which emits secondary and longer wavelength of light.

Due to the blue peak is much higher than that of the yellow one, the current LED binary structure is very strong in its blue wavelength while the yellow wide waveform is a complimentary waveform to generate a white color. Therefore, color rendering index, Ra is only 75 (sunlight Ra=100). This is the main reason why LED white lighting always turns out a bluish cool color.

There are two more challenges besides the color rendering quality: temperature stability of phosphors and color uniformity vs. viewing angle. The former is critical factor for the life-span of the LED backlight There is a trade-off between brightness and thermo management in a design of LED BU. It is obvious in the art that a means of brightness and color enhancement is absolutely necessary for the LED-backlit TV/monitor to accomplish high performance and long life-span.

Figure 2:
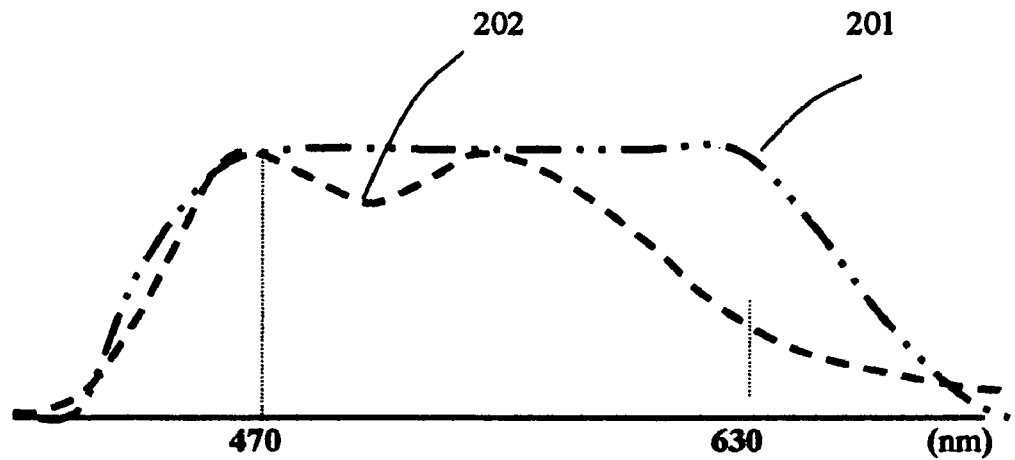
FIG. 2 demonstrates the comparative curves between the present invention and the traditional broadband polarizer.

Turning now to FIG. 2, illustrated is a reflective bandwidth curve of present invention compared with the curve of traditional broadband polarizer films. Curve 201 represents a traditional reflective spectrum of BBP (broadband Polarizer) films. The Bragg reflection of the BBP film normally covers entire visible wavelength with the bandwidth at least 300 nm. The thickness of the BBP film is in a range of 15-30 μm in order to obtain a sufficient reflectivity over the visible bandwidth. The thicker the film is the longer production cycle time and higher material cost will be. The other optical problem with the thicker layer is the color shift issue due to the anisotropic structure of the LCP material. The back portion of the film works as a retardation layer of the front portion of the film when a light beam passing through at a bias angle relative to the normal direction. Thus it causes a discoloration.

Curve 202 represents a reflective spectrum of the present invention. Obviously, the bandwidth is not as wide as the curve 201 in its red color area. The present inventive cholesteric polarizer film has a tunable waveform which matches the waveform of the LED backlight The resulting structure of the cholesteric polarizer film provides the LED TV/monitor with extraordinary optical performances compared with the traditional broadband polarizer. In summary, it has the following advantages:

1. Exactly recycling the backlighting spectrum whereby it brings about a sizeable reduction of the redundant color shift.
2. The film thickness of the cholesteric film can be in the range of 6-10 microns, therefore the material cost will be reduced accordingly.
3. Manufacturing process becomes much simpler with the combination of a narrow bandwidth and relatively wide bandwidth cholesteric material.
4. The most advantageous feature of the invention is especially to enhance the LED brightness in the wavelengths other than blue color, for example, green and red colors. The color-shift compensation is centered on the yellow stoke's waveform in order to achieve more balanced white light.

Turning now to FIG. 3, illustrated is a schematic drawing of two-layer brightness enhancement film structure with indistinct interlayer and the manufacturing process.

Figure 3A:
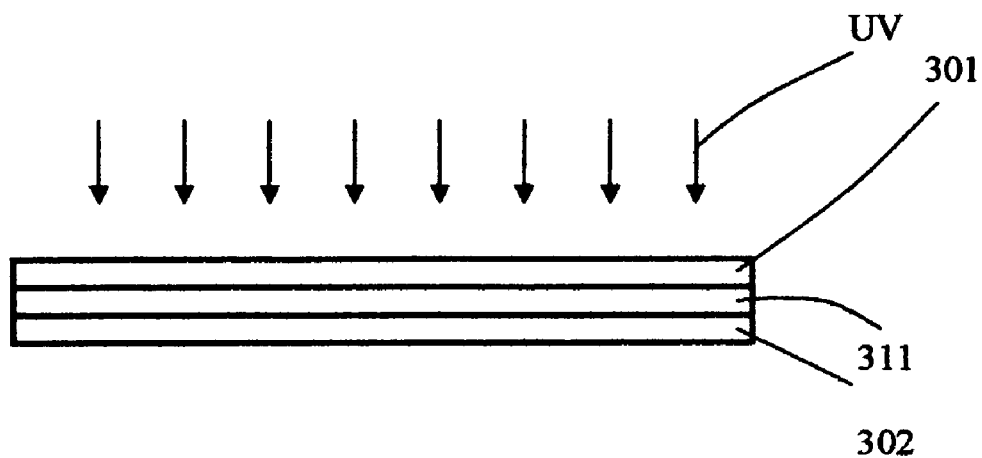
FIG. 3A demonstrates the narrow band blue color layer structure.

FIG. 3A demonstrates the first layer deposition process for making a blue color narrowband film. The structure consists of a permanent substrate 302, a temporary substrate 301 and a cholesteric layer 311. A cholesteric mixture is made of CLC monomer, polymeric spacer and a UV initiator. The CLC monomer is a low molecular compound containing a polymerizable double bond and a mesogenic cholesteric group. The viscosity of the mixture is adjusted in the range of 100~500 CP. The optimal percentage of the spacer material is in the range of 0.15~0.2%.

The syntheses of CLC monomer, cholesterol ester of ω-methacryloyloxyvaleric acid (ChM-5) is described as follows:

1. Cholesterol ester of ω-bromovaleric acid
   Distilled triethylamine (0.04 moles) was added to 0.03 moles of cholesterol dissolved in 150 ml of absolute benzene, after which acylchloride of the corresponding ω-bromovaleric acid (0.04 moles) was slowly added. The solution was vigorously mixed at room temperature for two hours. Benzene was then evaporated: the resulting precipitate was dissolved in ether, washed with water and dried over fused $MgSO_4$. Then ether was partly evaporated and CHBrAc-5 was precipitated with methanol. The precipitate was filtered and purified by column chromatography (silica gel, benzene). ChBrAc-5: M.p.=123 C, yield=90%.
2. Cholesterol ester of ω-methacryloyloxyvaleric acid (ChM-5)
   0.013 moles of ChBrAc-5, 0.025 moles of potassium methacrylate and 0.4 g of hydroquinone were dissolved in 60 ml of distilled DMF under the constant follow of argon. The reaction mixture was then heated to 115 C and kept at this temperature for 8 hours with periodic agitation. After cooling to room temperature, the solution was diluted with a 5-fold amount of ether and thoroughly washed with water. The solution was dried over fused $MgSO_4$, the solvent was entirely evaporated and the reaction products were chromatographically separated on a silica gel column with benzene used simultaneously as a solvent and eluent. Yield of ChM-5=62%.

A coater and a laminator can be used to carry out the application of cholesteric ChM-5 mixture. A pair of nip rubber rollers is designed with durability of 45~50 and adjustable gap control mechanism. The laminator also has a registration and speed control system. The mixture 311 is applied on the substrate 301 by a doctor roller coater with dry thickness of 3-5 μm. The film 302 is laid on the top of ChM-5 coating web while moving through the rubber nip of the laminator. Thus, the CLC monomer with good molecular alignment is spread out between the two substrates. The color tint of the Bragg reflection has a non-linear dependence of temperature because both the pitch and Δn are the variables of temperature. When the sandwiched structure is moved on the heating oven and the temperature is controlled from high to low, three primary colors will appear accordingly at three-temperature points. For example, the blue color will appear at 32 C while the yellow color will be displayed at 27 C. The first blue narrow band layer was cured at temperature 32 C by UV beam at intensity of 5 mw/$cm^2$ (UV 360 nm) for 30 seconds.

The temporary substrate 301 and the permanent substrate 302 also work as alignment layers during the lamination process to ensure the cholesteric formulation is aligned in a good planar texture before being polymerized.

After the UV light exposure, the temporary plastic substrate 301 is delaminated from the permanent substrate 302. The polymerized first blue color material 311 is left on the permanent substrate 302.

Figure 3B:
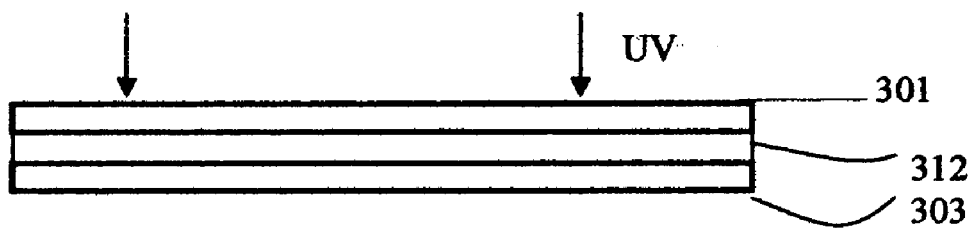
FIG. 3B demonstrates the broad band yellow color layer structure.

FIG. 3B demonstrates the second layer deposition process for making a yellow color broad band film. The structure consists of a permanent substrate 303, a temporary substrate 301 and a cholesteric layer 312. The cholesteric mixture and the application process are the same as FIG. 3A. The coating thickness is in the range of 5-10 μm. The curing temperature is controlled in the range of 25-28 C while a weak UV dosage (intensity=0.05 mw/$cm^2$, λ=360 nm) is exposed on the web at a predetermined time period.

To achieve broad band yellow layer, a cholesteric monomer, cholesterol ester of ω-acryloyloxyvaleric acid (ChA-5) is also synthesized as follows:

0.012 moles of ChBrAc-5, 0.028 moles of acrylic acid, 0.4 g of hydroquinone and 0.028 moles of distilled triethylamine were dissolved in 60 ml of distilled DMF under the constant follow of argon. The reaction mixture was then heated to 115 C and kept at this temperature for 8 hours, with periodic agitation. After cooling to room temperature, the solution was diluted with a 5-fold amount of ether and thoroughly washed with water. The solution was dried over fused $MgSO_4$, the solvent was entirely evaporated and the reaction products were chromatographically separated on a silica gel column with benzene used simultaneously as a solvent and eluent. Yield of ChA-5=44%.

The mixing ratio of the ChM-5 and ChA-5 was kept at 1:1.

After the UV light exposure, the temporary plastic substrate 301 is released from the permanent substrate 303. The polymerized second yellow color material 312 is left on the permanent substrate 303.

Figure 3C:
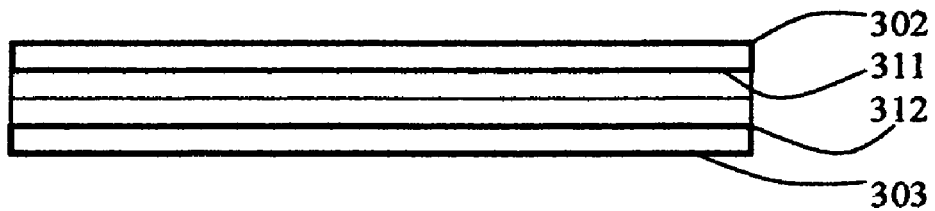
FIG. 3C demonstrates the laminated structure of the narrow band and wideband layers.

FIG. 3C demonstrates the two-layer LED-backlight brightness enhancement film structure. A. Hot laminator carries out the lamination process. A pair of nip rollers, including a stainless metal roller and a rubber roller with durability of 45~50, are preset at the surface temperature of 125 C.

It is also applicable during the lamination that a thin layer of CLC material with the thickness 1-2 μm may be applied between the layer 311 and 312 to ensure an optical contact of the two layers. In this case, a UV post-cure is necessary to get the CLC material polymerized completely.

Here comes an example regarding the specifications of the material. The temporary film is a 5-mil polyester film (Milar, Dupond, USA) with the thickness of 125 μm. The first permanent substrate 302 is a TAC (cellulose triacetate LUCKY film, China) with the thickness of 50~80 μm. And the second permanent substrate 303 is a ¼λ retarder film with the retardation rate 140~150 nm. Please note that, instead of the center wavelength of the 550 μm of the retardation film in the prior arts, the present retardation film is designed in the 590 nm or even higher in order to achieve the best color quality with minimum color shift. Due to the fact that the blue color peak of the white LED BU is very sharp and saturated, the color shift compensation of the brightness enhancement film will be centered on the yellow bandwidth. So a synergy of a broad band yellow color cholesteric layer and a yellow bandwidth retardation film is necessary.

Figure 4:
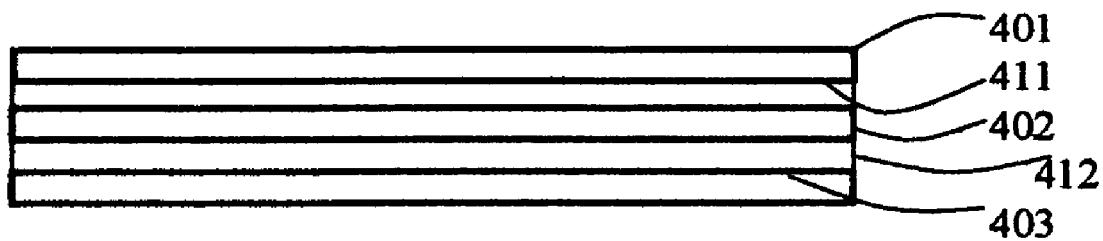
FIG. 4 demonstrates a two-layer cholesteric film structure.

Turning now to FIG. 4, illustrated is a schematic drawing of another two-layer film structure with distinct interlayer. A Teijin DuPont PEN film, Teonex, with thickness of 50 μm, works as a core carrier film 402. The first coating layer 411 is a narrow band blue color cholesteric polymer, as shown in FIG. 3A, being laminated between the TAC film 401 and the first side of the core film 402. The second coating layer 412 is a wide band yellow color cholesteric polymer as shown in FIG. 3B, being laminated between the retardation film 403 and the second side of the core film 402. The addition of the core film 402 is of a specially benefit for the large panel LED-backlit TV application, where a stiffness of the enhancement film is required for stand-up backlit arrangements.

A coater and a laminator are used for the application of cholesteric ChM-5 mixture. A pair of nip rubber rollers is designed with durability of 45~50 and with an adjustable gap control mechanism. The laminator also has a registration and speed control system. The mixture 311 is applied on the first side of core film 402 by a doctor roller coater with dry thickness of 3-5 μm. The TAC film 401 is laid on the top of ChM-5 coating web while moving through the hot rubber nip of the laminator. Thus, the CLC monomer with good molecular alignment is spread out between the two substrates. The first blue narrow band layer was cured at temperature 32 C by UV light at intensity of 5 mw/cm$^2$ (UV 360 nm) for 30 seconds.

The substrate 401 and the substrate 402 also work as alignment layers during the hot lamination process to ensure the cholesteric formulation is aligned in a good planar texture before being polymerized.

The second CLC layer application is on the other side of the core carrier film 402 for making a yellow color broad band film. The cholesteric mixture and the application process are the same as FIG. 3B. The coating thickness is in the range of 5-10 μm. And the curing temperature is controlled in the range of 25-28 C while a weak UV dosage (intensity=0.5 mw/cm$^2$, λ=360 nm) is exposed on the web at a predetermined time period. After the exposure, two protection films are laminated on the outside of the TAC film and the retardation film separately.

Figure 5:
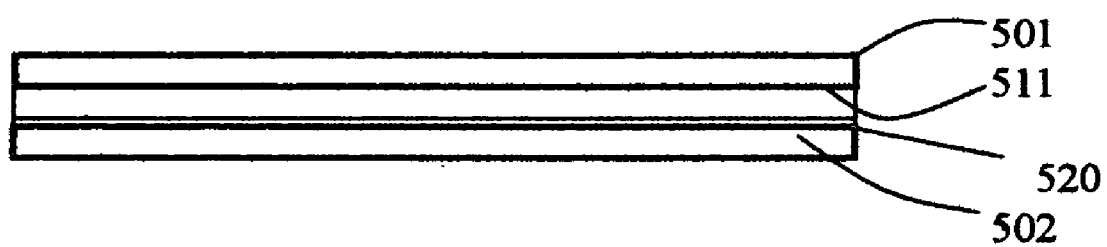
FIG. 5 demonstrates a single-layer cholesteric film structure.

Turning now to FIG. 5, illustrated is a schematic drawing of a single-layer LED-backlit TV/Monitor brightness and color enhancement film structure.

In order to realize a film with better optical performances, fast production throughput and more post effectiveness, a signal-layer process has been developed. A cholesteric film 511, positioned between a TAC film 501 and retardation film 502, is formed by the thermo induced pitch change and UV initiated polymerization process. This feature will be described in detail in immediately below. This method allows the color spectrum being controlled by a certain physical parameter such as UV dosage as well as temperature gradient so that the exactly color spectrum can be realized within a thickness in the range of 5~25 μm and more preferably of 8~10 μm. This approach also allows the cholesteric material being coated in the same substrate without using multiple laminations as indicated in FIG. 3 and FIG. 4. Thermo induced pitch change is very convenient and feasible for a mass production process. Normally, a polymerizable cholesterol ester can be used in such application which allows the Bragg reflection shift from red to violet colors covering the entire visible spectrum. There are two curing stages: firstly, at higher temperature level in its blue bandwidth, the CLC becomes partially cured to form a narrow band Bragg reflection; and secondly, at lower temperature with the center bandwidth around the yellow color, the remaining CLC becomes substantially cured, along a variable temperature decrement, to form a broad band Bragg reflection.

Table 1 shows the relationship between the cholesteric color and temperature level of ChA-5 and ChM-5:

TABLE 1

| COLOR(λ) | ChA-5(C) | ChM-5(C) |
|---|---|---|
| 650 nm | 17 | 26 |
| 600 nm | 17.5 | 27 |
| 575 nm | 17.7 | 27.3 |
| 550 nm | 18 | 27.5 |
| 500 nm | 20 | 28.5 |
| 450 nm | 25 | 33.5 |
| 410 nm | 34 | 40 |

The production process can be described in the following examples:

EXAMPLE 1

On a sheet of 5-mil polyester film (Milar, Dupond, USA) a cholesteric mixture 511 with the following ratio:
MEK 66%
ChM-5 33.9%
Irgacure 184 0.1%.
was coated by a slot die coater at a speed of 1.5 m/min in a class 1000 yellow light clean room environment. After the solvent is evaporated, the web is laminated with a TAC film 501 by a lot rubber nip at 125 C at a speed of 1.5 in/minute. In the first heating chamber at temperature 33 C, a medium pressure UV lamp was exposed at the intensity 2.5 mw/cm$^2$ for 5 second. Thus a blue color thin layer was initially formed. And then the web was immediately moving into the second heating chamber with a temperature gradient from 28 C to 26 C while the UV dosage was kept at 0.5 mw/cm$^2$ for 4 min. After the UV light exposure, the PET film was peeled off. The polymerized CLC coating 511 was left on the TAC film 501. Finally, a retardation film 502 coated with a pressure sensitive adhesive (PSA) layer 520 was laminated on the web to form a single-layer film wherein the narrow band blue waveform and the broad band yellow waveform have no distinct interlayer.

EXAMPLE 2

On a sheet of 5-mil polyester film (Milar, Dupond, USA) a cholesteric mixture 511 with the following ratio:
MEK 66%
ChA-5 33.9%
Irgacure 184 0.1%
was coated by a slot die coater at a speed of 1.5 m/min in a class 1000 yellow light clean room. After the solvent is evaporated, the web is then laminated with a TAC film 501 by a hot rubber nip laminator at a speed of 1.5 in/minute. In the first heating chamber at temperature 25 C, a medium pressure UV lamp was exposed at the intensity 02.5 mw/cm$^2$ for 5 second. Thus a blue color thin layer was initially formed. The web was immediately moving into the second heating chamber at a temperature gradient from 18 C to 16 C while the UV dosage was kept at 0.5 mw/cm$^2$ for 4 min. After the UV light exposure, the temporary PET film was peeled off. The polymerized CLC coating 511 was left on the TAC film 501. Finally, a retardation film 502 with 25 μm pressure sensitive adhesive (PSA) layer 520 was laminated onto the web 511 to form a single-layer film wherein the narrow band blue waveform and the broad band yellow waveform have no distinct interlayer.

As a result, a single-layer brightness and color enhancement film product has been invented.

I claim:

1. A LED-backlit TV/monitor optical film comprising:
   a. a cholesteric polymer layer having the first and the second major optical wavelengths, and
   b. a polarization conversion layer, and
   c. at least one alignment layer attached to at least one surface of the film;
   wherein the recycling reflective spectrum of the film, comprising a narrow-band waveform around the first major optical wavelength and a broad-band waveform around the second major optical wavelength, matches substantially a LED emitting spectrum;
   wherein the polarization conversion layer has an optimal retardation for the broad-band waveform of the film;
   whereby the brightness and the color quality of the LED-backlit TV/monitor is substantially enhanced.

2. The optical film as in claim 1 wherein the cholesteric polymer layer is built up by a single mesomorphic chemical structure.

3. The optical film as in claim 1 wherein the cholesteric polymer has at lease one optical layer.

4. The optical film as in claim 1 wherein the recycling reflection is consisting of two waveforms, the first is narrow band blue waveform and second is broad band yellow waveform.

5. The optical film as in claim 1 wherein the cholesteric polymer is a UV beam curable polymer.

6. The optical film as in claim 1 wherein the cholesteric polymer layer has a thickness in the range of 5~25 micrometer.

7. The optical film as in claim 1 wherein the cholesteric polymer layer has a distinct interlayer.

8. The optical film as in claim 1 wherein the cholesteric polymer layer has an indistinct interlayer.

9. The optical film as in claim 1 wherein the narrow band blue color has a bandwidth at least 50 nm.

10. The optical film as in claim 1 wherein the broad band yellow color has a bandwidth at least 150 nm.

11. The optical film as in claim 1 wherein the polarization conversion film is a yellow light quarter wave retardation film.

12. A method of fabricating a LED-backlit TV/monitor optical film comprising steps of:
   a. applying the cholesteric mixture onto at least one substrate with a specific optical function to form a layer with a predetermined thickness while maintaining the mixture at mesomorphic phase,
   b. forming a film with a specula narrow band Bragg reflection at a high temperature below CLC clearing point,
   c. cooling the film to the blue color at the first temperature level,
   d. first UV exposing the blue color layer at high intensity for a predetermined duration and initiating a localized polymerization,
   e. further cooling the film to yellow color range at the second temperature range,
   f. second UV exposing the film at low intensity,
   g. maintaining a temperature decrement for a controllable duration to form a broad-band reflection around the yellow light wavelength,
   wherein each color of the cholesteric layer is a distinct function of the temperature and the polymerization speed is controlled by the UV intensity correlated with temperature;
   whereby the LED-backlit TV/monitor optical film is formed.

13. The method of fabricating an optical film as in claim 12 wherein the layer with predetermined thickness has the thickness in the range of 5~25 μm.

14. The method of fabricating an optical film as in claim 12 wherein the cholesteric mixture is including a monomer ChA-5.

15. The method of fabricating an optical film as in claim 12 wherein the cholesteric mixture is including a monomer ChM-5.

16. The method of fabricating an optical film as in claim 12 wherein the cholesteric mixture is including a monomer cholesterol ester.

17. The method of fabricating an optical film as in claim 12 wherein the cholesteric mixture is also including a UV initiator.

18. The method of fabricating an optical film as in claim 12 is a thermo induced pitch change and UV induced polymerization process.

19. The method of fabricating an optical film as in claim 12 wherein the cholesteric polymer layer has a distinct interlayer.

20. The method of fabricating an optical film as in claim 12 wherein the cholesteric polymer layer has an indistinct interlayer.

* * * * *